(12) United States Patent
Napoles et al.

(10) Patent No.: US 10,855,335 B1
(45) Date of Patent: Dec. 1, 2020

(54) RING-SHAPED DEVICES WITH COMBINED BLUETOOTH AND NEAR-FIELD COMMUNICATION ANTENNA ASSEMBLIES

(71) Applicant: Amazon Technologies, Inc., Seattle, WA (US)

(72) Inventors: Adrian Napoles, Bellevue, WA (US); Ulf Jan-Ove Mattsson, Campbell, CA (US); Sarah Graber, Seattle, WA (US); Jose Escobar, Union City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/583,679

(22) Filed: Sep. 26, 2019

(51) Int. Cl.
| | |
|---|---|
| *H04B 5/00* | (2006.01) |
| *H01Q 7/08* | (2006.01) |
| *H04W 4/80* | (2018.01) |
| *H04B 5/06* | (2006.01) |

(52) U.S. Cl.
CPC ............ *H04B 5/0037* (2013.01); *H01Q 7/08* (2013.01); *H04B 5/0081* (2013.01); *H04B 5/06* (2013.01); *H04W 4/80* (2018.02)

(58) Field of Classification Search
CPC .. H04B 5/0037; H04B 5/0081; H04B 5/0025; H04B 5/06; H04B 5/0031; H04W 4/80; H01Q 7/08
USPC ........................................................ 455/41.1
See application file for complete search history.

(56) References Cited

U.S. PATENT DOCUMENTS

| | | | | |
|---|---|---|---|---|
| 9,960,814 | B2 * | 5/2018 | Nagai | H04B 5/0031 |
| 10,681,818 | B1 * | 6/2020 | Graber | G06F 3/017 |
| 2014/0266624 | A1 * | 9/2014 | Van Bosch | G06K 7/087 340/10.1 |
| 2015/0277559 | A1 * | 10/2015 | Vescovi | G06F 21/31 345/173 |
| 2015/0287412 | A1 * | 10/2015 | Tang | H04R 1/021 704/275 |
| 2016/0034742 | A1 * | 2/2016 | Kim | H04B 1/385 382/124 |
| 2016/0292563 | A1 * | 10/2016 | Park | G06F 3/04883 |
| 2017/0235334 | A1 * | 8/2017 | von Badinski | A61B 5/0205 368/10 |
| 2017/0235933 | A1 * | 8/2017 | von Badinski | A61B 5/0205 726/19 |
| 2018/0204445 | A1 * | 7/2018 | Bereshchanskiy | A44C 9/00 |
| 2019/0086951 | A1 * | 3/2019 | von Badinski | G02B 19/0052 |
| 2019/0204865 | A1 * | 7/2019 | Von Badinski | A61B 5/0205 |
| 2019/0384354 | A1 * | 12/2019 | von Badinski | G06F 1/163 |

* cited by examiner

*Primary Examiner* — Sonny Trinh
(74) *Attorney, Agent, or Firm* — Eversheds Sutherland (US) LLP

(57) ABSTRACT

Systems, methods, and computer-readable media are disclosed for ring-shaped devices with combined Bluetooth and NFC antenna assemblies. In one embodiment, an example device may include an inner shell, an outer shell coupled to the inner shell, where the outer shell and inner shell together form a first side portion, a second side portion, and a lower portion of the ring-shaped device, a battery, and an antenna assembly that forms an upper portion of the ring-shaped device. The antenna assembly may include a metal substrate, a ferrite layer disposed on the metal substrate, and a metallic loop structure disposed on the ferrite layer.

20 Claims, 6 Drawing Sheets

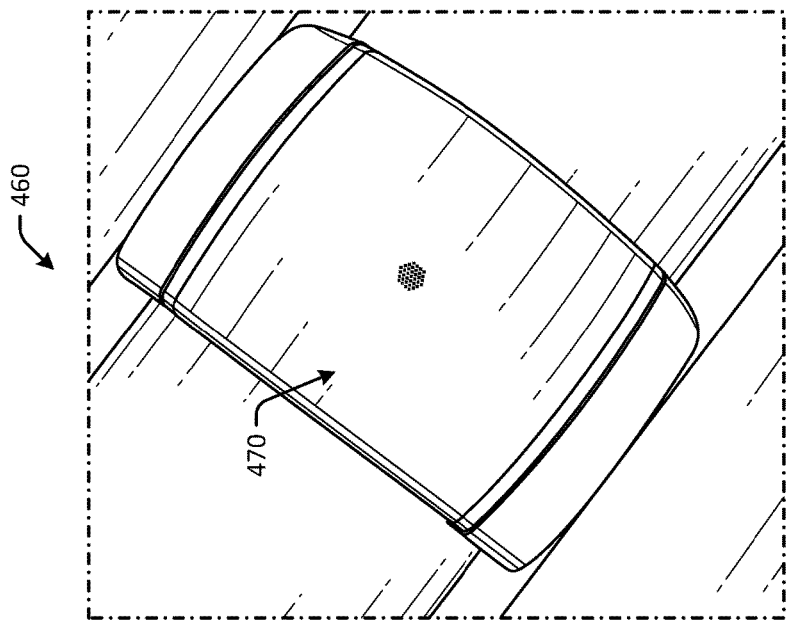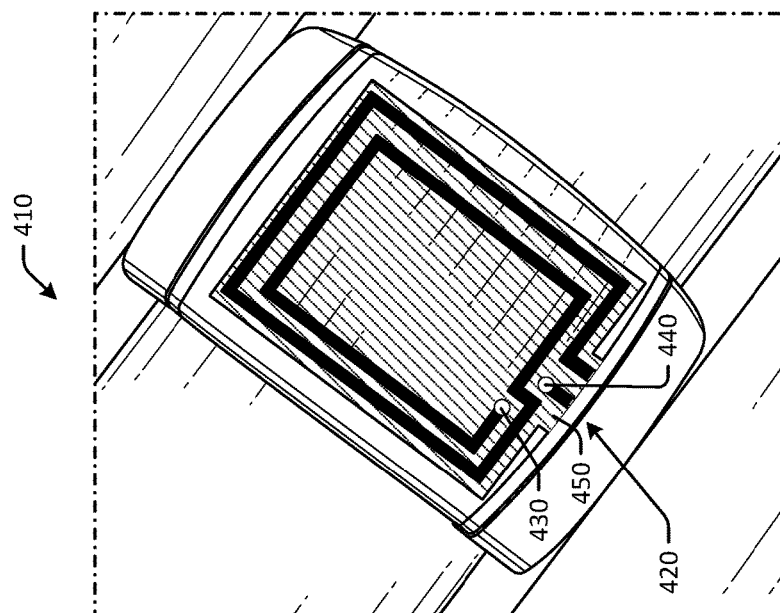
FIG. 4

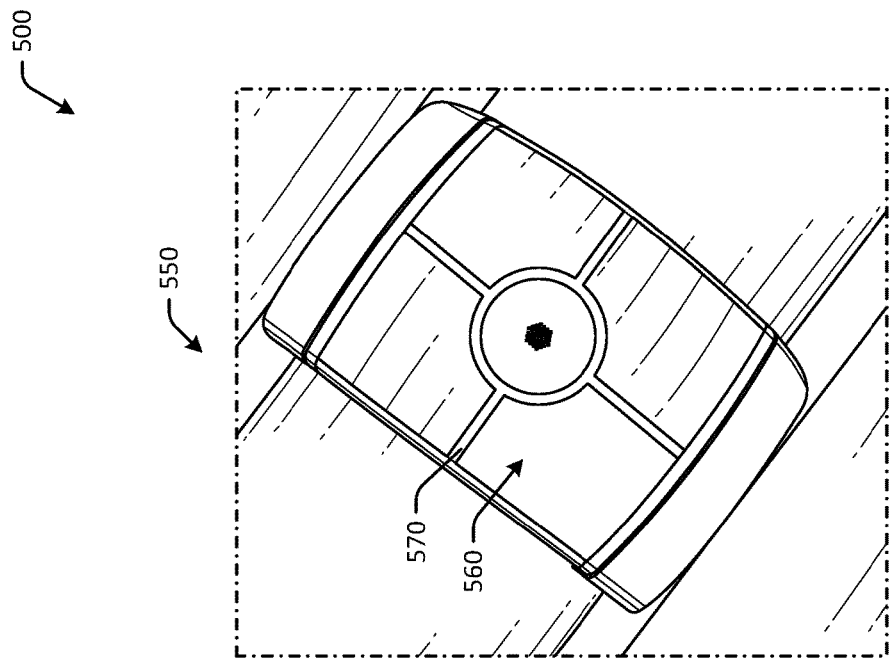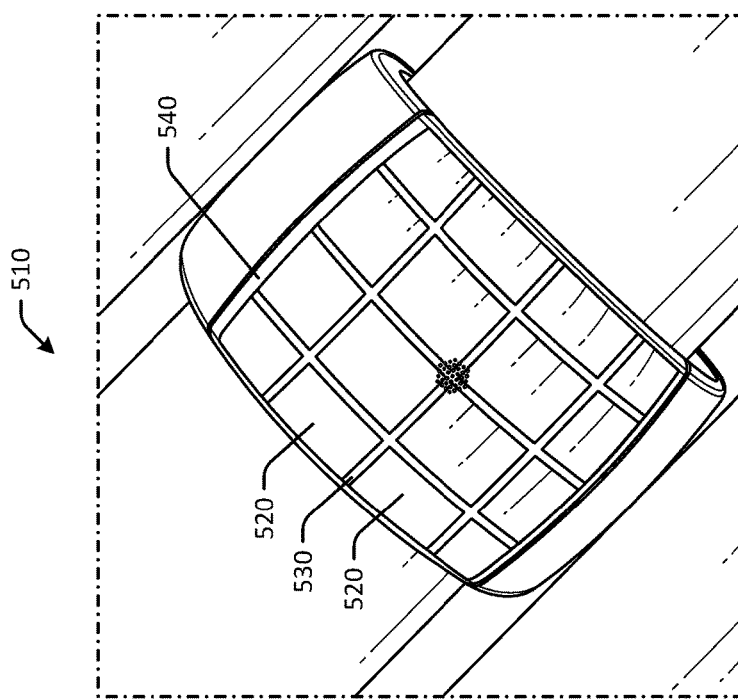
FIG. 5

RING-SHAPED DEVICES WITH COMBINED BLUETOOTH AND NEAR-FIELD COMMUNICATION ANTENNA ASSEMBLIES

BACKGROUND

Electronic devices may include components for wireless communication. For example, smartphones may include components to communicate data both over a Bluetooth connection, as well as over a Near-Field Communication connection. In some instances, electronic devices like ring-shaped devices may have small footprints or sizes, and may therefore have limited space for wireless communication components, such as antennae and the like. In such electronic devices, wireless communication capabilities may be desired, regardless of a size of the electronic device.

BRIEF DESCRIPTION OF THE DRAWINGS

FIG. 4 is a schematic drawing of antenna feed points for a combined Bluetooth and Near-Field Communication antenna assembly in accordance with one or more embodiments of the disclosure.

FIG. 5 is a schematic drawing of a ring-shaped device with decorative patterns on a combined Bluetooth and Near-Field Communication antenna assembly in accordance with one or more embodiments of the disclosure.

Figure 1:
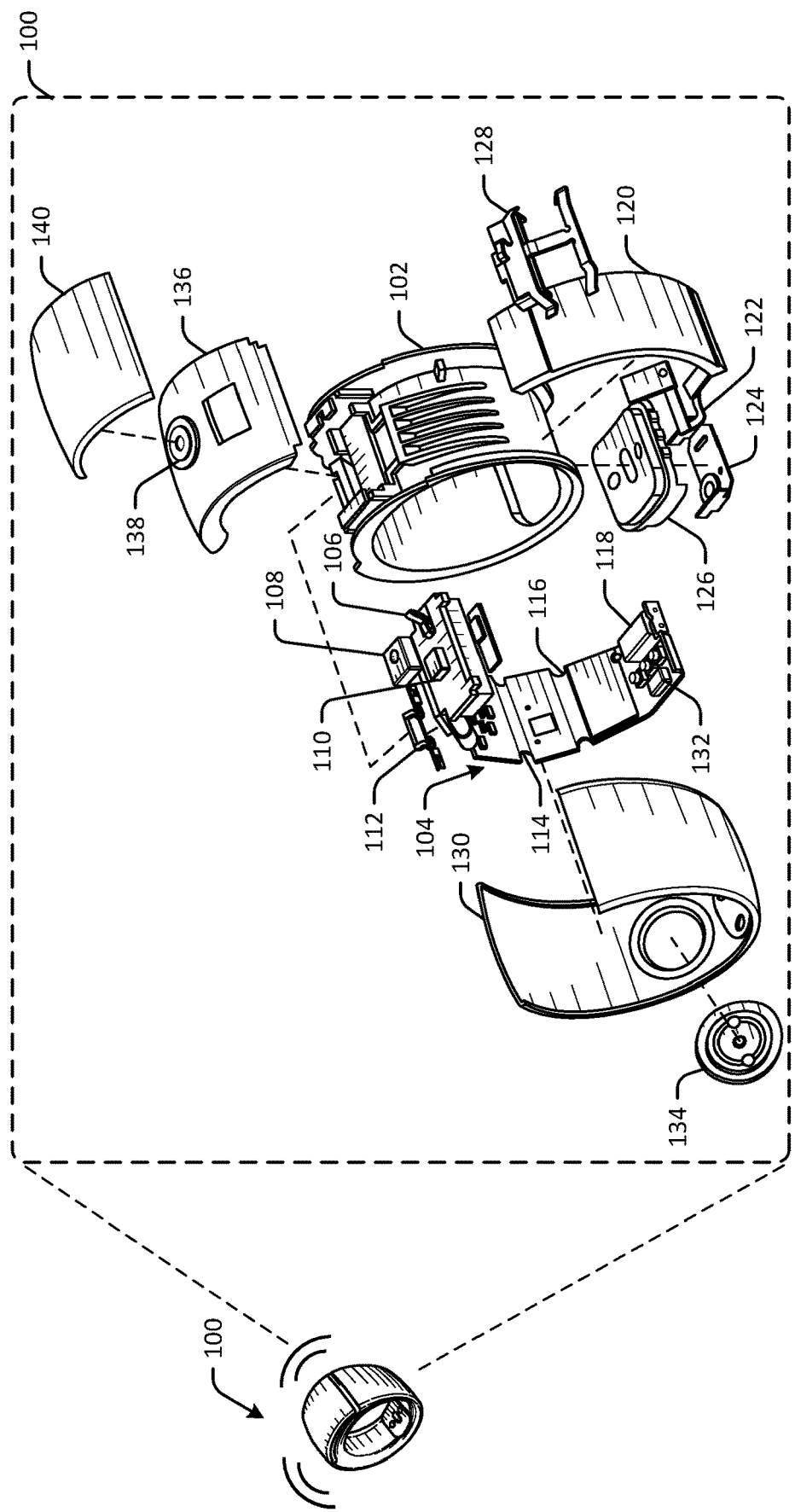
FIG. 1 is a schematic drawing of a ring-shaped device with a combined Bluetooth and Near-Field Communication antenna assembly in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may encompass, depending on the context, a plural number of such components or elements and vice versa.

DETAILED DESCRIPTION

Overview

Electronic devices may be used to wirelessly send and receive data. For example, certain electronic devices, such as smartphones, tablets, laptop computers, and other mobile devices, may include one or more components that can be used to wirelessly communicate over one or more networks. For wireless communication, electronic devices may use certain components, such as radios, transceivers, antennae, and/or other components. Certain electronic devices may be small in size or may have small footprints, and may therefore have limited space (internal or external) in which electronic components are placed. In addition, some electronic devices may be wirelessly chargeable, such as by using inductive charging. Wireless charging may be enabled by including additional components, such as charging coils, to the device, which may further consume internal space within the device.

Wearable devices may be devices that are small in size or that have small footprints. Wearable devices include electronic devices that a user can wear, for example, as an accessory, or can otherwise take with them, such as in the user's pocket. Wearable devices may include watches, bracelets, glasses, electronic trackers, and so forth. Because wearable devices may be worn by users, factors of the device including size, weight, shape, and the like may affect a user experience with the device. For example, a device that is bulky, heavy, or too large may be impractical for certain users to use or wear. In addition, reducing a size or footprint of a device may affect the functionality of the device. For example, reducing the size of a battery in the device may reduce an amount of time the device can operate without being recharged. Accordingly, a size, shape, weight, and/or other factors may impact not only a user experience with a wearable device, but functionality of the device as well. However, wireless communication capabilities for such devices may be desired, as well as wireless charging. Accordingly, ring-shaped devices with combined batteries and antennas may be desired.

Embodiments of the disclosure include ring-shaped devices that have combined Bluetooth and Near-Field Communication (NFC) antenna assemblies, thereby reducing the amount of space consumed within the device due to the respective antennas. In addition, some devices include wireless charging functionality. As a result of space saving due to the combined Bluetooth and NFC antenna assemblies, some embodiments may include additional components related to wireless charging functionality without increasing a size or footprint of the device, and/or without increasing internal space consumption. The combined Bluetooth and NFC antenna assemblies may function as a single antenna element and may be positioned at the top (e.g., the 12:00 o'clock position) ("top," "bottom," and "size" as used herein are for illustrative purposes as reference positions, and are not absolute positions) or the bottom (e.g., the 6:00 o'clock position) of a ring-shaped device, so as to avoid performance degradation due to radio frequency absorption by adjacent fingers when the ring-shaped device is worn on a user's finger. Some embodiments may include wireless charging hardware, such as an NFC antenna component that enables the device to charge wirelessly, such as at a frequency of 13.56 MHz. Embodiments may therefore be able to wirelessly charge, communicate over a Bluetooth connection, and communication over a NFC connection. In some instances, an NFC antenna element in the form of a low profile loop antenna structure may be disposed on a Bluetooth antenna element in the form of a metal substrate, thereby reusing the Bluetooth antenna space and eliminating or minimizing device growth. Positioning of antenna feeds for both antenna elements may be determined based on the low impedance side of the Bluetooth antenna, and as a result, a high impedance side of the Bluetooth antenna element may not be loaded down, and efficiency may be maintained.

Embodiments of the disclosure may include combined Bluetooth and NFC antenna assemblies that consume less physical space inside a device relative to devices with separate Bluetooth and NFC antenna elements. Embodiments may therefore reduce a footprint or amount of space consumed within a device. Different wearable devices may have different capabilities. For example, a wearable glasses device may be configured to provide augmented reality information on a display of the glasses, while a wearable watch device may be configured to detect heartrate, monitor physical activity, and so forth. Embodiments of the disclosure include combined Bluetooth and NFC antenna assemblies that can be included in any suitable device, such as ring-shaped electronic devices that may be worn by users as a ring around the user's finger. The ring-shaped devices may be configured to detect voice or speech input and may be configured to wirelessly communicate with other electronic devices. For example, in some instances, a user may be unable or unwilling to take a smartphone out of the user's pocket or bag. However, the user may wish to set a timer, send a message, or perform another task. Using the ring-shaped devices described herein, the user may speak a voice command to the ring-shaped device, and the ring-shaped device may send the voice command to the user's smartphone or other device. The user may therefore not have to physically interact with the smartphone. Other examples of functionality include using the ring-shaped devices to control other electronic devices, such as televisions, stereos, content streaming devices, and so forth, sending voice messages, receiving information (e.g., audible presentation of a current time, etc.), and other functionality. Using NFC communication, users may make wireless payments, present boarding passes, manage wireless charging, and/or other functionality.

Because the user may wear the ring-shaped device around a finger, the size of the ring-shaped device may be limited. In addition, wireless performance of the ring-shaped device, such as transmission range, may be affected by contact between the ring-shaped device and adjacent fingers. For example, the nearby fingers may absorb radio waves transmitted by the ring-shaped device. Accordingly, the combined Bluetooth and NFC antenna assemblies described herein may reduce or maintain an amount of space consumed within the larger device, while improving or maintaining wireless performance.

This disclosure relates to, among other things, systems, methods, computer-readable media, techniques, and methodologies for ring-shaped devices with combined Bluetooth and NFC antenna assemblies. Embodiments may include antenna structures that combine Bluetooth and NFC antenna elements. Such embodiments may eliminate separate antennas that may otherwise be positioned within a ring-shaped device.

In some embodiments, a combined Bluetooth and NFC antenna assembly may be positioned at the top of a ring-shaped electronic device, such that the combined Bluetooth and NFC antenna assembly is exposed to the environment when worn by a user. As a result, antenna performance may not be negatively impacted by contact with a user's finger, adjacent fingers, or palm.

Referring to FIG. 1, a schematic drawing of a ring-shaped device 100 with a combined Bluetooth and NFC antenna assembly is illustrated in exploded view in accordance with one or more embodiments of the disclosure. In the illustrated example, a user may use the ring-shaped device 100 to communicate with another electronic device, such as a smartphone, a wireless payment terminal, or a different device. To interact with the ring-shaped device 100, the user may, in some instances, interact with a button or other component of the ring-shaped device 100 to initiate monitoring for voice input. In other instances, the user may interact with the ring-shaped device 100 by speaking a wake word, such as "Alexa," or by making a certain gesture, such as lifting the user's hand towards the user's mouth. The ring-shaped device 100 may listen for a request or voice command, and may respond accordingly. For example, the ring-shaped device 100 may cause one or more operations to be performed, such as controlling other devices (e.g., televisions, lights, radios, thermostats, etc.), may respond with audio or visual information (e.g., weather, news, messages, etc.), and/or may perform different actions in response to a request or command.

The ring-shaped device 100 may have a housing. The housing may be ring-shaped and/or substantially circular, and may be formed of one or more portions. For example, the housing may include an inner shell 102 and an outer shell 130. A combined Bluetooth and NFC antenna assembly 140 may form at least a portion of the housing, such as a top portion or upper portion. The housing may include a curved upper portion, a curved lower portion, a first curved side portion, and a second curved side portion.

The ring-shaped device 100 may include the inner shell 102. The inner shell 102 may be in contact with a user's finger when the ring-shaped device 100 is worn by a user. The inner shell 102 may be formed of metal, such as stainless steel, and in some instances, may be formed of metal injection molded panacea material. The inner shell 102 may be formed of metal to improve biocompatibility and/or the feel of the ring-shaped device 100 to a user.

The inner shell 102 may be coupled to the outer shell 130. The outer shell 130 may be formed of a metal material, such as titanium. In some embodiments, the outer shell 130 may be formed of a stamped titanium material. The inner shell 102 may be disposed within the outer shell 130 and may be coupled using an adhesive, such as glue. In some embodiments, the inner shell 102 may be a circular inner shell, in that the outer surface of the inner shell 102 that is in contact with a user's finger during use may be circular or substantially circular. The circular portion of the inner shell 102 may form an inner surface of the housing of the ring-shaped device.

The ring-shaped device 100 may be configured to communicate wirelessly with one or more other devices over one or more networks using the combined Bluetooth and NFC antenna assembly 140. The ring-shaped device 100 may have a relatively small footprint, as well as limited internal space within a housing of the ring-shaped device 100. The combined Bluetooth and NFC antenna assembly 140 may be disposed along the top of the ring-shaped device 100 and may be formed at least partially of metal, such as a stamped titanium material. The combined Bluetooth and NFC antenna assembly 140 may form a portion of the outer surface of the housing of the ring-shaped device 100. The combined Bluetooth and NFC antenna assembly 140 may be a curved antenna assembly, so as to maintain a curvature of an outer surface of the ring-shaped housing. The outer shell 130 may be coupled to the curved combined Bluetooth and NFC antenna assembly 140. In some embodiments, one or more holes or apertures may be formed in the combined Bluetooth and NFC antenna assembly 140, and a microphone may be aligned with the one or more holes or apertures. In some embodiments, the inner shell 102, the outer shell 104, the combined Bluetooth and NFC antenna assembly 140, and/or an optional plastic carrier component may be glued together for structural sealing.

The combined Bluetooth and NFC antenna assembly 140 may be a metal component and may have one or more layers. For example, the combined Bluetooth and NFC antenna assembly 140 may include a base metal layer that is a Bluetooth antenna element, a metal loop structure that is an NFC antenna element, and a ferrite layer that separates the base metal layer from the metal loop structure. The respective antennas may be fed using different antenna feed structures, such as those described with respect to FIGS. 3-4. In some embodiments, the combined Bluetooth and NFC antenna assembly 140 may include a cover layer and/or a decorative metal deposit layer, while in other embodiments the ring-shaped device 100 may include a cover layer and/or a decorative metal deposit layer.

The combined Bluetooth and NFC antenna assembly 140 may be formed at least partially of, or entirely of, a conductive material. The combined Bluetooth and NFC antenna assembly 140 may be a resonant structure that resonates at a predetermined frequency, and therefore serves as a Bluetooth antenna and an NFC antenna for the ring-shaped device 100. For example, the combined Bluetooth and NFC antenna assembly 140 may be configured to resonate at a frequency of 900 MHz, 2.4 GHz, 5.8 GHz, or another frequency. The combined Bluetooth and NFC antenna assembly 140 may resonate in response to the RF output from the radio transceiver/transmitter 104, and/or during receipt of wireless communications from another device. The frequency at which the combined Bluetooth and NFC antenna assembly 140 resonates may be a function of, in some embodiments, a size of the combined Bluetooth and NFC antenna assembly 140 (e.g., a surface area of the combined Bluetooth and NFC antenna assembly 140, a length and width of the combined Bluetooth and NFC antenna assembly 140, etc.). In some embodiments, certain features may be included as part of the combined Bluetooth and NFC antenna assembly 140 that may impact or affect the frequency at which the housing resonates, such as slots or openings in the housing, flexible antenna attachments, and other features.

The battery 120 may be a power source for the ring-shaped device 100. The battery 120 may be a curved battery or may have a different geometry. For example, the battery 120 may have a flexible outer surface and may be in a flexible pouch or semi-flexible/semi-rigid package configuration. The battery 120 may be configured to power the ring-shaped device 100. The battery 120 may be any suitable battery type, such as lithium ion, nickel cadmium, etc. The battery 120 may be rechargeable. The battery 120 may be disposed in the housing of the ring-shaped device 100 along an upper portion of the ring-shaped device 100 or in a side portion of the ring-shaped device 100.

The ring-shaped device 100 may include the radio transceiver/transmitter 130. In some embodiments, the ring-shaped device 100 may include only a receiver, only a transmitter, or a transceiver. In some embodiments, the radio transceiver/transmitter 130 may be a writeable RFID receiver. The radio transceiver/transmitter 130 may be configured to facilitate wireless communication for the device. The radio transceiver/transmitter 130 may be coupled to the electrical system via one or more input/output (TO) lines, which may be used for instructions or data transfer between the electrical system 120 and/or the controller and the radio transceiver/transmitter 130. The radio transceiver/transmitter 130 may be electrically coupled to and/or powered by the battery 120, and may be grounded by the electrical system. Other embodiments may include any suitable wireless communication component, such as at least one of a transmitter, a receiver, and/or a transceiver.

The radio transceiver/transmitter 130 may output one or more radio frequency signals having a certain frequency. For example, the radio transceiver/transmitter 130 may be configured to output data over a WiFi radio frequency, an RFID radio frequency, a Bluetooth radio frequency, a ZigBee radio frequency, a Near Field Communication radio frequency, or another radio frequency.

One or more components may be disposed within the housing of the ring-shaped device 100. For example, a flexible printed circuit assembly 104 may be disposed inside the housing along a first side of the ring-shaped device 100. A number of components may be coupled to or mounted on the flexible printed circuit assembly 104. For example, an antenna feed component 106 may be disposed at a first segment of the flexible printed circuit assembly 104. The antenna feed component 106 may couple the flexible printed circuit assembly 104 (and/or one or more components of the flexible printed circuit assembly 104) to the combined Bluetooth and NFC antenna assembly 140. In some embodiments, the antenna feed component 106 may be configured to electrically couple the flexible printed circuit assembly 104 to the combined Bluetooth and NFC antenna assembly 140. A first microphone 108 may be disposed on the flexible printed circuit assembly 104 adjacent to the antenna feed component 106. The first microphone 108 may be disposed at or near an upper portion of the ring-shaped device 100, and may therefore be used for noise cancellation, as a user may not wish to speak into the upper portion of the ring-shaped device 100 (e.g., the user may find doing so awkward, etc.). The first microphone 108 may be configured to cancel ambient noise. A haptic feedback device 110 may be disposed on the first segment of the flexible printed circuit assembly 104 adjacent to the antenna feed component 106. The haptic feedback device 110 may be a resonant haptic device and may include a piezoelectric actuator in some instances. The haptic feedback device 110 may be configured to provide haptic or vibrational feedback to a user. A grounding spring 112 may be coupled to the flexible printed circuit assembly 104 and the inner shell 102 and/or outer shell 130 to provide grounding. In some embodiments, the grounding spring 112 may be coupled to a first flexible portion 114 of the flexible printed circuit assembly 104 between respective segments of the flexible printed circuit assembly 104. For example, the first flexible portion 114 may be positioned between a second segment and a third segment of the flexible printed circuit assembly 104, and a second flexible portion 116 may be positioned between the third segment and a fourth segment of the flexible printed circuit assembly 104. The grounding spring 112 may be used in conjunction with optional conductive foams disposed about the bend regions or flexible portions of the flexible printed circuit assembly 104. The bend regions or flexible portions may include exposed coverlay sections that provide access to cross-hatched copper ground, and the grounding spring 112 and/or conductive foams may couple the cross-hatched copper ground to the outer shell 130 and/or inner shell 102.

The antenna feed component 106, optional first microphone 108, and haptic feedback ring-shaped device 100 may be disposed on a first side of the flexible printed circuit assembly 104. The first side may be outward facing, or may face the outer shell 130 of the ring-shaped device 100. Additional components may be disposed on a second side of the flexible printed circuit assembly 104. The second side may be opposite the first side and may be, in some instances, inward facing, or may face the inner shell 102.

For example, a speaker assembly 118 may be disposed on the second side of the flexible printed circuit assembly 104. The speaker assembly 118 may be disposed on a segment of the flexible printed circuit assembly 104 that is at an opposite end of the flexible printed circuit assembly 104 with respect to the antenna feed component 106, in some embodiments.

The ring-shaped device 100 may include one or more microphones configured to detect sound and/or generate an audio signal. The microphones may be positioned within the housing and may correspond to the locations of one or more microphone holes on the housing. A second microphone 132 may be disposed adjacent to the speaker assembly 118. The second microphone 132 may be configured to detect voice input.

The flexible printed circuit assembly 104 may be coupled to a power source, such as the battery 120. The battery 120 may be a curved battery and may be configured to power the ring-shaped device 100. The battery 120 may be any suitable battery type, such as lithium ion, nickel cadmium, etc. the battery 120 may be rechargeable. The battery 120 may be disposed in the housing of the ring-shaped device 100 along a second side of the ring-shaped device 100, or along a side of the housing opposite the flexible printed circuit assembly 104. The battery 120 may be coupled to the flexible printed circuit assembly 104 using, for example, a flexible jumper component 122. The flexible jumper component 122 may be used to form an electrical connection between the battery 120 and the flexible printed circuit assembly 104, and may remove the need for soldering in some instances. The flexible jumper component 122 may be configured to electrically couple the flexible printed circuit assembly 104 and the curved battery 120, where the flexible jumper component 122 may be disposed between a first end of the flexible printed circuit assembly 104 and a second end of the curved battery 120.

A strap 122 may be included to couple the battery 120 to an optional charging contact assembly 126. The charging contact assembly 126 may include one or more charging contacts that can be used to electrically couple a wireless charging coil of the ring-shaped device 100 to a charger in order to charge the battery 120. For example, the ring-shaped device 100 may include a wireless charging coil configured to charge the battery 120 at 13.56 MHz using the NFC antenna element. In some embodiments, the charging contacts may be inward facing (e.g., with respect to a center of the ring, etc.), while in other embodiments, the charging contacts may be outward facing (e.g., with respect to the outer shell 130, away from the ring, etc.). The charging contact assembly 126 may be coupled to the inner shell 102 and/or the outer shell 130. In some embodiments, the charging contact may be coupled to the inner shell 102 via the charging contact assembly 126, and the charging contact may be oriented in an inward facing orientation, or towards a center of the ring-shaped device 100. A grounding bridge 128 may be coupled to the battery 120 to provide grounding. The grounding bridge 128 may be coupled to the inner shell 102 and/or the outer shell 130.

A carrier component 136, which may be a plastic or glass bracket, may support the combined Bluetooth and NFC antenna assembly 140. The plastic carrier component 136 may include a curved body portion and one or more raised portions. The plastic carrier component 136 may at least partially separate the combined Bluetooth and NFC antenna assembly 140 from the outer shell 130 and/or the inner shell 102. For example, the plastic carrier component 136 may be disposed in the housing of the ring-shaped device 100 between the combined Bluetooth and NFC antenna assembly 140 and the inner shell 102, and may include raised portion(s) that are disposed between the combined Bluetooth and NFC antenna assembly 140 and the outer shell 130. In some embodiments, a portion of the plastic carrier component 136 may be externally visible. Accordingly, the plastic carrier component 136 may optionally form at least a portion of the outer surface of the housing of the ring-shaped device 100. A microphone vent seal 138 may be disposed on an outer surface of the plastic carrier component 136 and may provide sealing for the first microphone 108.

The ring-shaped device 100 may include one or more pressable or physical buttons. For example, the ring-shaped device 100 may include a button assembly 134 may be disposed along a lower portion of the housing of the ring-shaped device 100. The button assembly 134 may include one or more buttons that can be used, for example, to initiate a voice command to the ring-shaped device 100. The button assembly 134 may be coupled to the outer shell 130. Any number of buttons or manually configurable inputs may be included.

One or more audio ports and/or perforated holes for audio may be disposed on the outer shell 130 adjacent to the button assembly 134 and may allow for sound to exit the housing, but may prevent solid particle ingress. Microphone ports and/or speaker ports may be sealed using mesh and membrane to increase water resistance and/or for waterproofing.

Example embodiments of the disclosure provide a number of technical features or technical effects. For example, in accordance with example embodiments of the disclosure, certain embodiments of the disclosure may reduce space consumed by separate antenna elements and/or assemblies, increase mechanical strength, and/or reduce device footprints. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
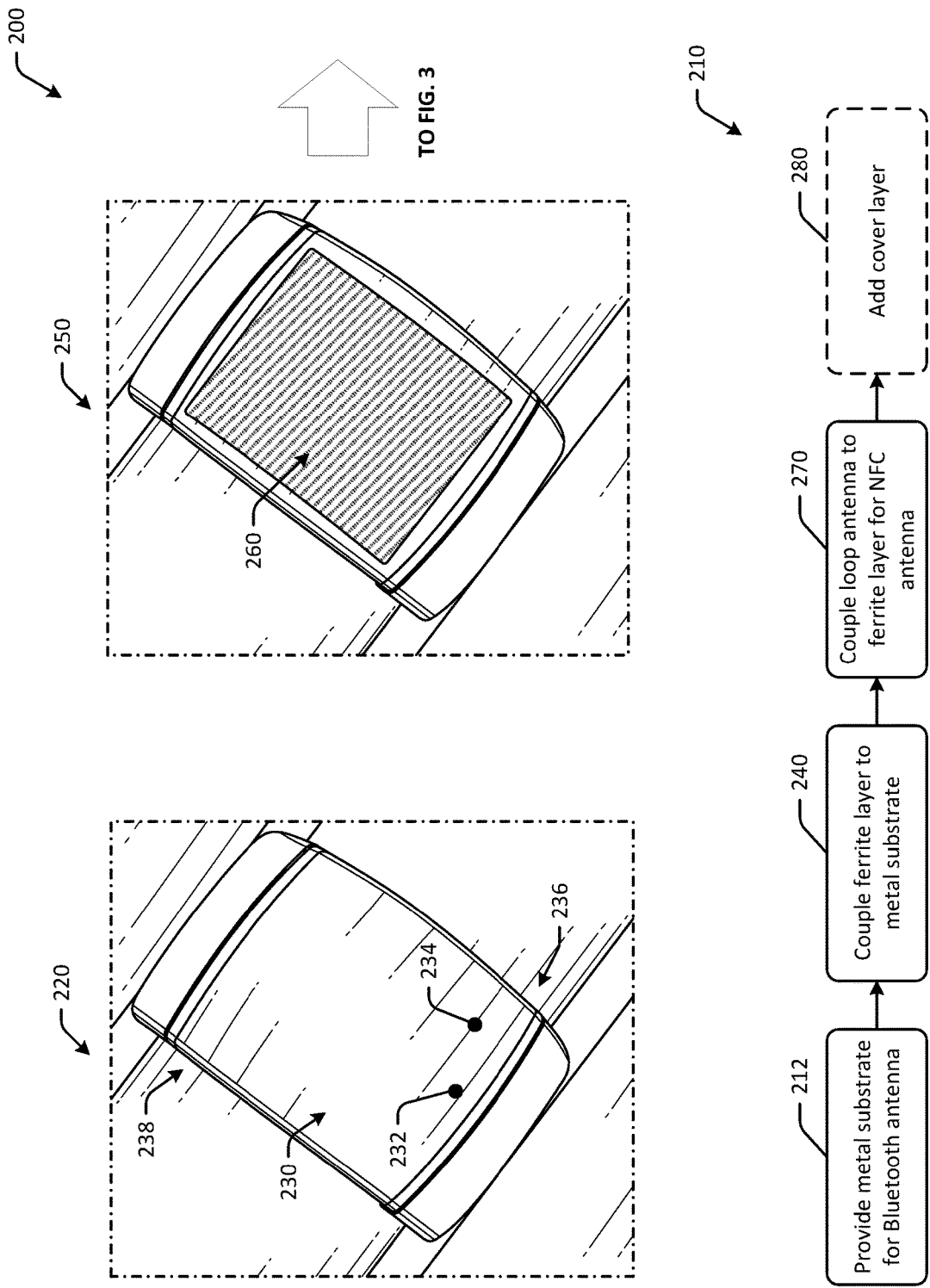
FIG. 2 is a perspective view a ring-shaped device with a combined Bluetooth and Near-Field Communication antenna assembly in different states and an example process flow in accordance with one or more embodiments of the disclosure.
Figure 3:
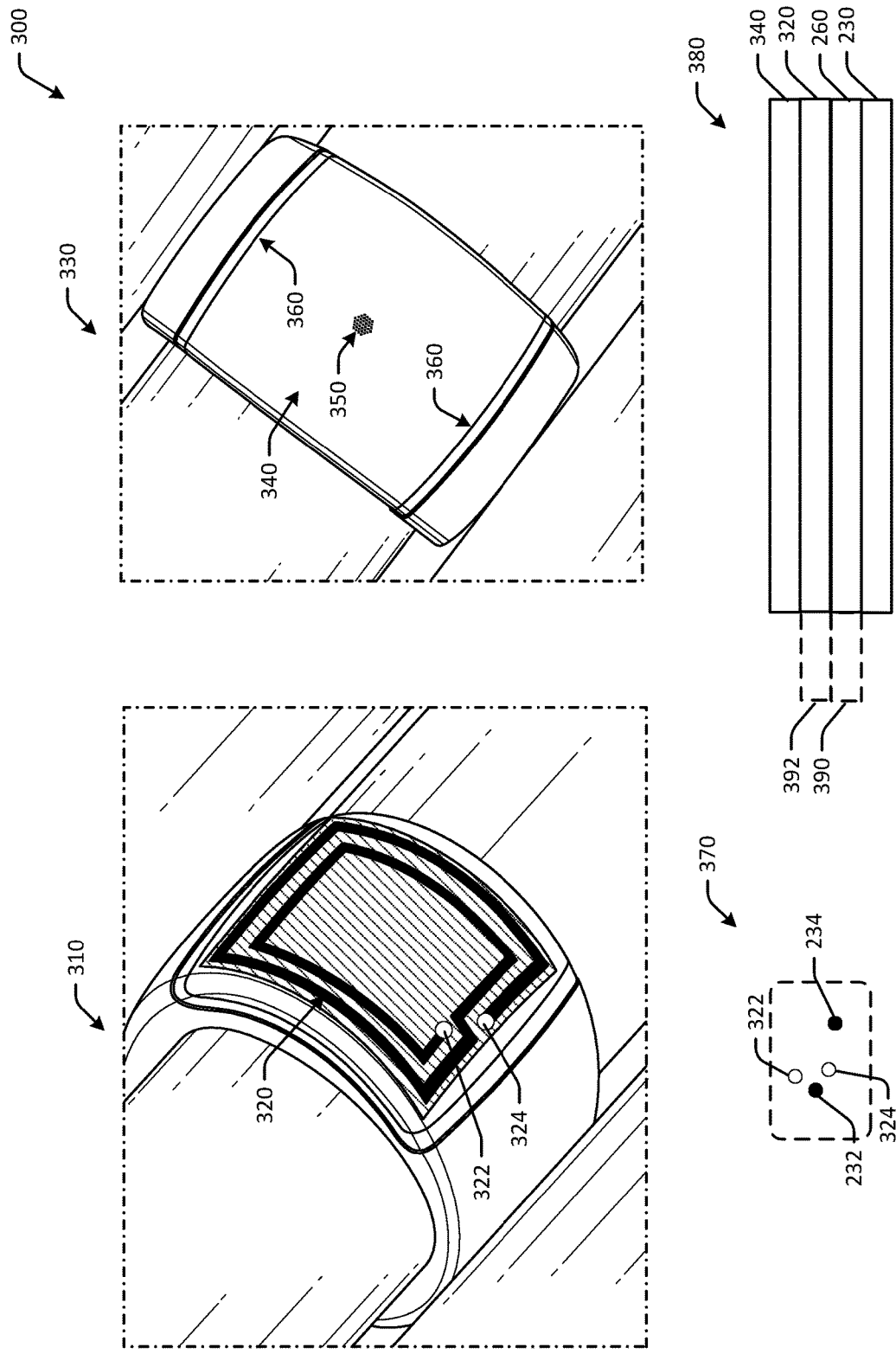
FIG. 3 is a perspective and cross-sectional view a ring-shaped device with a combined Bluetooth and Near-Field Communication antenna assembly in different states in accordance with one or more embodiments of the disclosure.

FIG. 2 is a perspective view a ring-shaped device 200 with a combined Bluetooth and Near-Field Communication antenna assembly in different states and an example process flow 210 in accordance with one or more embodiments of the disclosure. Other embodiments may include additional, fewer, and/or different components. Some or all of the components illustrated in FIG. 2 may not be illustrated to scale. The device illustrated in FIG. 2 may be the same or different than the device discussed with respect to FIG. 1. FIG. 3 is a perspective and cross-sectional view a ring-shaped device 300 with a combined Bluetooth and Near-Field Communication antenna assembly in different states in accordance with one or more embodiments of the disclosure. FIG. 3 will be discussed in conjunction with FIG. 2. Other embodiments may include additional, fewer, and/or different components. Some or all of the components illustrated in FIG. 3 may not be illustrated to scale. The device illustrated in FIG. 3 may be the same or different than the device discussed with respect to FIGS. 1-2.

In FIG. 2, the ring-shaped device 200 is illustrated in perspective view. The ring-shaped device 200 may be worn around a user's finger. As depicted, the ring-shaped device 200 may have a consistent or uniform thickness in some embodiments, while in other embodiments, the ring-shaped device 200 may have a non-uniform thickness. For example, an upper portion of the ring-shaped device 200 may have a greater thickness than the side portions of the ring-shaped device 200. The upper portion of the ring-shaped device 200 may be exposed to the environment when worn by a user.

The ring-shaped device 200 may include an inner shell and an outer shell coupled to the inner shell. The outer shell and inner shell together may form a first side portion, a second side portion, and a lower portion of the ring-shaped device 200. The first side portion and/or the second side portion may be in contact with an adjacent finger(s) when worn by a user.

The ring-shaped device 200 may include the combined Bluetooth and Near-Field Communication antenna assembly coupled to the outer shell and the inner shell of the ring-shaped device 200. The combined Bluetooth and Near-Field Communication antenna assembly may form at least part of an upper portion of the ring-shaped device 200. In some embodiments, an outer surface of the combined Bluetooth and Near-Field Communication antenna assembly may be flush with an outer surface of the outer shell of the ring-shaped device 200. In other embodiments, the outer surface (e.g., outward facing) of the combined Bluetooth and Near-Field Communication antenna assembly may be raised relative to the outer surface of the outer shell. The combined Bluetooth and Near-Field Communication antenna assembly may have a curved contour and may be at least partially formed of metal or a metallic material. A flexible printed circuit assembly may be positioned inside the ring-shaped device 200 and disposed along the first side portion and/or the second side portion of the ring-shaped device 200. The flexible printed circuit assembly may be coupled to the antenna assembly 210 and the battery.

The ring-shaped device 200 may include a carrier component that separates the combined Bluetooth and Near-Field Communication antenna assembly from the inner shell and/or outer shell. The carrier component may be plastic, glass, or another suitable material configured to separate the antenna assembly from the inner shell and/or outer shell of the ring-shaped device 200. The separation may improve the performance of the combined Bluetooth and Near-Field Communication antenna assembly. The carrier component may include one or more portions. In some embodiments, the carrier component may have a substantially rectangular geometry. In another embodiment, the carrier component may include a first curved portion disposed along a first side of the ring-shaped device 200, a second portion disposed across a width of the ring-shaped device 200, a third curved portion on a side of the ring-shaped device 200 opposite the first curved portion, and a fourth portion disposed across the width of the ring-shaped device 200. The fourth portion may be separated into two or more disjointed segments in some embodiments, or two or more joined segments in other embodiments. The first curved portion of the carrier component may be continuous and may be disposed along a continuous side of the combined Bluetooth and Near-Field Communication antenna assembly. A continuous side may indicate a side in which there are no interruptions to the carrier component. In some embodiments, the carrier component may include a curved portion disposed between the combined Bluetooth and Near-Field Communication antenna assembly and the inner shell of the ring-shaped device 200, a first raised portion disposed between a first side of the combined Bluetooth and Near-Field Communication antenna assembly and the outer shell, the first raised portion having a first length, and a second raised portion disposed between a second side of the combined Bluetooth and Near-Field Communication antenna assembly and the outer shell, the second raised portion having a second length that is less than the first length. The second raised portion may be disposed adjacent to another raised portion that is coaxially aligned with the first raised portion.

The ring-shaped device 200 may include a first side portion having a first thickness, and a second side portion having the same first thickness. The ring-shaped device 200 may include a lower portion that has the first thickness or a different thickness that is less than the first thickness. The first thickness may be equal to, less than, or greater than a second thickness of the lower portion, and/or a third thickness of the upper portion of the ring-shaped device 200. In some embodiment, a thickness of the ring-shaped device 200 may be uniform.

To form the combined Bluetooth and Near-Field Communication antenna assembly of the ring-shaped device 200, the process flow 210 may be performed. In some embodiments, the operations of the process flow 210 may be performed in a different order and may be performed at least partially concurrently.

At a first block 212 of the process flow 210, a metal substrate may be provided for the Bluetooth antenna. The metal substrate may be configured to act as an antenna to send and/or receive data over a wireless connection, such as over a Bluetooth communication protocol.

At a first manufacturing state 220, a metal substrate 230 may be provided. The metal substrate 230 may be curved and may form an upper portion of the ring shaped device 200. The metal substrate 230 may be configured to operate as a Bluetooth antenna at a frequency of 2.4 GHz. A first side 236 of the metal substrate 230 may be a low impedance side of the Bluetooth antenna. A second side 238 of the metal substrate 230 may be a high impedance side of the Bluetooth antenna. The first side 236 and the second side 238 may be sides of the Bluetooth antenna that extend along the width of the ring-shaped device 200. The low impedance side may have a relatively lower impedance than the high impedance side of the Bluetooth antenna.

An antenna feed 234 and an antenna ground 232 for the Bluetooth antenna may be disposed at or near the first side 236, or the low impedance side, of the Bluetooth antenna. As a result, current density may be biased toward the first side 236, or the low impedance side, and performance degradation of the Bluetooth antenna as a result of wireless charging may be avoided.

At a second block 240 of the process flow 210, a ferrite layer may be coupled to the metal substrate. For example, a layer of a ferrite material may be disposed on the metal substrate. The ferrite material may be used to prevent shorting between the metal substrate (e.g., Bluetooth antenna) and the NFC antenna, and/or to reduce interference between the respective Bluetooth and NFC antennas. The ferrite material may be used to reduce the low frequency (13.56 MHz) NFC or wireless charging current on the metal surface and thereby improve NFC and wireless charging performance.

At a second manufacturing state 250, a ferrite material layer 260 may be coupled to the metal substrate 230. The ferrite material layer 260 may be coupled using any suitable method, such as with an adhesive. The ferrite material layer 260 may be formed at least partially of ferrite or another radio frequency interference blocking material. The ferrite material layer 260 may have a thickness of about 0.1 millimeter, such as about 0.8 mm to about 1.2 mm.

At a third block 240 of the process flow 210, a loop antenna may be coupled to the ferrite layer for an NFC antenna. For example, a loop antenna may be disposed on the ferrite layer. The loop antenna may be configured to act as an antenna to send and/or receive data over a wireless connection, such as over an NFC communication protocol. In some embodiments, the loop antenna may be used to manage wireless charging, such as NFC-based wireless charging at 13.56 MHz. The loop antenna may therefore be configured to operate at 13.56 MHz.

In FIG. 3, a ring-shaped device 300 is depicted. The ring-shaped device 300 may be the same as the ring-shaped device 200. At a third manufacturing state 310, a loop antenna 320 may be disposed on the ferrite material layer 260. The loop antenna 320 may be configured to serve as the NFC/wireless charging antenna. The loop antenna 320 may be a flexible circuit and may be adhered to the ferrite material layer 260. In other embodiments, the loop antenna 320 may be printed on top of the ferrite material layer 260. Other suitable processes or methods may be used to couple the loop antenna 320 to the ferrite material layer 260. The loop antenna 320 may be a radio antenna having a loop or coil of electrically conductive material. The loop antenna 320 may be a single, double, or multiple turn loop antenna. The loop antenna 320 may include NFC antenna feeds disposed at or near the first side 236 of the metal substrate 230. For example, the loop antenna 320 may include a first antenna feed 322 and a second antenna feed 324. The respective antenna feeds 322, 324 may be coupled to respective ends of the loop antenna 320. For example, the first antenna feed 322 may be coupled to a first end of the loop antenna 320, and the second antenna feed 324 may be coupled to a second end of the loop antenna.

At an optional fourth block 280 of the process flow 210 in FIG. 2, a cover layer may be added to protect the metal substrate, ferrite layer, and loop antenna structure. The cover layer may be a part of the combined Bluetooth and Near-Field Communication antenna assembly in some embodiments, while in other embodiments, the cover layer may be a part of the ring-shaped device 200.

In FIG. 3, at a fourth manufacturing state 330, a cover layer 340 may be disposed on top of the metal substrate 230, ferrite material layer 260, and loop antenna 320 structure. The cover layer 340 may be coupled to the combined Bluetooth and Near-Field Communication antenna assembly, or to the ring-shaped device 200. The cover layer 340 may be formed of glass, plastic, ceramic, or another material. In some embodiments, the cover layer 340 may be formed of a non-conductive material. A plastic carrier 360 may be disposed about the combined Bluetooth and Near-Field Communication antenna assembly and may separate the combined Bluetooth and Near-Field Communication antenna assembly from the inner shell and/or outer shell of the ring-shaped device 200. The cover layer 340 may include optional microphone holes 350 that allow for speech input to one or more microphones inside the ring-shaped device 200.

In a detail view 370, the Bluetooth antenna feed 234 and the Bluetooth ground 232 are shown, along with the first antenna feed 322 and the second antenna feed 324 of the NFC antenna. The NFC antenna feeds may be positioned relatively closer to the Bluetooth ground 232 than to the Bluetooth feed 234, for improved NFC antenna and Bluetooth antenna performance. For example, the Bluetooth antenna feed 234 may be a first antenna feed coupled to the metal substrate at a low impedance side of the antenna assembly. The metal substrate may be used for wireless communication over a Bluetooth protocol. The first antenna feed 322 for the NFC antenna may be a second antenna feed of the antenna assembly, and may be coupled to a first end of the metallic loop structure at the low impedance side of the antenna assembly, where the metallic loop structure is used for wireless communication over an NFC protocol. The second antenna feed 324 may be a third antenna feed of the antenna assembly, and may be coupled to a second end of the metallic loop structure. The Bluetooth ground 232 may be an antenna ground coupled to the metal substrate at the low impedance side of the antenna assembly. Accordingly, the NFC antenna may have two antenna feeds, and the Bluetooth antenna may have one antenna feed.

As shown in the detail view 370, the second antenna feed of the antenna assembly (e.g. the first antenna feed 322) may be positioned a first distance from the antenna ground 232 and a second distance from the first antenna feed 234. The first distance may be less than the second distance, such that the first antenna feed 322 is closer to the antenna ground 232 than to the Bluetooth antenna feed 234.

Similarly, the third antenna feed of the antenna assembly (e.g. the second antenna feed 324) may be positioned a first distance from the antenna ground 232 and a second distance from the first antenna feed 234. The first distance may be less than the second distance, such that the second antenna feed 324 is closer to the antenna ground 232 than to the Bluetooth antenna feed 234.

In the embodiment illustrated in FIG. 3, the NFC antenna 320 may be fed from underneath. Accordingly, the first antenna feed 322 and the second antenna feed 324 may be routed through holes or gaps in the metal substrate 230. The feeds may be electrically isolated from the metal substrate 230. Low profile contacts may be used for the respective antenna feeds. In some embodiments, the antenna assembly may include an aperture extending through the metal substrate 230 and/or the ferrite layer 260, where the first antenna feed 322 and/or the second antenna feed 324 is routed through the aperture in the metal substrate 230 and/or the ferrite layer 260.

A cross-sectional view 380 of the antenna assembly is depicted in FIG. 3. The antenna assembly may include the metal substrate 230 that forms a lower layer, the ferrite material layer 260 that forms a middle layer, a metallic loop structure 320 that forms a loop antenna and a middle layer, and an optional cover layer 340 that forms an upper layer. The ferrite material layer 260 may be coupled to, or may include, a tongue portion 390 that can be used to feed the NFC antenna in instances where the NFC antenna is not fed from underneath. Using the tongue, the NFC can be fed from the side, such as in the embodiment illustrated in FIG. 4. In another embodiment, a tongue portion 392 can be used to feed the NFC antenna, where the tongue portion 392 is coupled to the metallic loop structure 320 instead of the ferrite material layer 260. In some instances, the NFC antenna feeds (with or without tongue portions) can be located at or near the high impedance side of the Bluetooth antenna 230. In such instances, antenna performance may be degraded. However, in such embodiments, one or more radio frequency chokes may be used to prevent radio frequency energy from entering the NFC antenna. The choke(s) may be positioned on the NFC side feed lines (e.g., one or both of the feed lines), and a shorting capacitor may be used at the NFC input, where the shorting capacitor operates at the Bluetooth antenna frequency. The choke(s) may block energy from entering the device and/or NFC antenna.

Accordingly, the combined Bluetooth and Near-Field Communication antenna assembly provides Bluetooth and NFC communication capabilities, as well as wireless charging, for the ring-shaped device 200 in a compact form factor. In addition, the need for a separate wireless charging unit may be avoided, as the NFC interface can be used for wireless charging. In such instances, the NFC antenna may be used for communication and power transfer. For example, the NFC antenna may manage both communications and charging.

FIG. 4 is a schematic drawing of antenna feed points for a combined Bluetooth and Near-Field Communication antenna assembly in accordance with one or more embodiments of the disclosure. Other embodiments may include additional, fewer, and/or different components. The ring-shaped device may be any of the ring-shaped devices discussed with respect to FIGS. 1-3.

The embodiment of FIG. 4 illustrates a side-fed arrangement where the NFC antenna is fed from a tongue at the side of the antenna assembly, as opposed to from underneath. The side-fed embodiment may avoid the need to form an aperture in the metal substrate and/or ferrite material layer, and may reduce risk of short circuit, increase durability, and decrease manufacturing complexity.

In a first view 410, a ring-shaped device may include a combined Bluetooth and Near-Field Communication antenna assembly having a metal substrate, a ferrite layer 450, and a loop antenna. The ferrite layer 450 may be coupled to a tongue 420, or may include the tongue 420. The tongue 420 may be disposed between the ferrite layer 450 and a flexible printed circuit assembly inside the ring-shaped device. The ferrite layer 450 may include one or more holes or vias that can be used to route antenna feeds for the loop antenna. For example, a first via 430 may be used to route a first antenna feed to a first end of the loop antenna, and a second via 440 may be used to route a second antenna feed to a second end of the loop antenna. The vias may be holes configured to provide electrical coupling between the loop antenna and an antenna feed component. For example, the ring-shaped device may include a flexible printed circuit assembly with antenna feed component. The tongue 420 may be a flexible tongue component coupled to the flexible printed circuit assembly and the metal substrate and/or ferrite material layer 450. One or more of the NFC antenna feeds may be disposed on the flexible tongue component. In some embodiments, the ferrite layer 450 may include a via having a first end and a second end, and the ring-shaped device may include an antenna feed disposed on the flexible tongue component and coupled to the first end of the via. A second end of the metallic loop structure may be coupled to the second end of the via.

In a second view 460, an optional cover layer 470 may be disposed over the combined Bluetooth and Near-Field Communication antenna assembly. The cover layer 470 may be a low profile cover and may be made of glass, ceramic, mineral plastic, or another material.

FIG. 5 is a schematic drawing of a ring-shaped device 500 with decorative patterns on a combined Bluetooth and Near-Field Communication antenna assembly in accordance with one or more embodiments of the disclosure. Other embodiments may include additional, fewer, and/or different components. The ring-shaped device may be any of the ring-shaped devices discussed with respect to FIGS. 1-4.

Some ring-shaped devices may be modified to include one or more decorative patterns that can be disposed on a cover layer of a combined Bluetooth and Near-Field Communication antenna assembly. The decorative elements or patterns may improve aesthetic appearance of the ring-shaped device, and can be customized, such that logos, names, initials, text, images, patterns, or other geometries can be disposed on the cover layer. The metal elements may not degrade NFC or Bluetooth antenna performance, or wireless charging performance.

For example, in a first embodiment 510, a rectangular pattern of metal elements 520 may be disposed on top of a cover layer of the combined Bluetooth and Near-Field Communication antenna assembly. The metal elements 520 may be deposited on the cover layer using a physical vapor deposition process in one example. Other examples include platable plastic material, laser direct structuring, three-dimensional printing, and/or other processes. The individual metal elements 520 may be spaced apart by gaps 530 to reduce radio frequency currents on the metal elements 520. The gaps 530 may also separate the metal elements 520 from edges of the cover layer to reduce metal interference. In a second embodiment 550, the metal patches 560 may have unique geometries, but may nonetheless be separated by gaps 570 so as to avoid individual metal elements having relatively large surface areas (e.g., relative to the cover layer surface area).

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
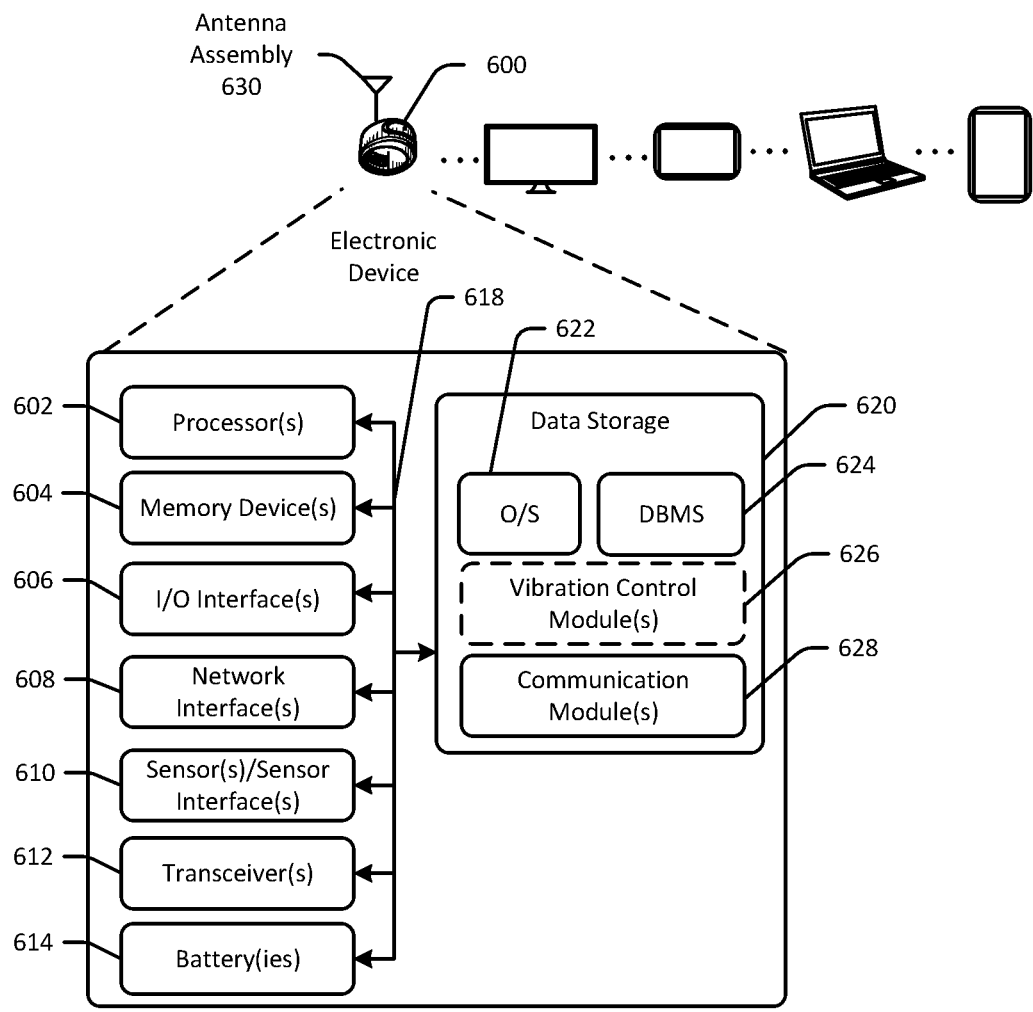
FIG. 6 schematically illustrates an example architecture of a device with combined Bluetooth and Near-Field Communication antenna assembly in accordance with one or more embodiments of the disclosure.

FIG. 6 is a schematic block diagram of one or more illustrative electronic device(s) 600 in accordance with one or more example embodiments of the disclosure. The electronic device(s) 600 may include any suitable computing device with or without a display, in some instances, including, but not limited to, a server system, a mobile device, a wearable device, or the like; a content streaming device; a scanning device; a speaker device; or the like. The electronic device(s) 600 may correspond to an illustrative device configuration for the ring-shaped devices of FIGS. 1-5.

The electronic device(s) 600 may be configured to communicate with one or more servers, user devices, or the like. The electronic device(s) 600 may be configured to determine voice commands/speech input, determine wakeword utterances, determine and/or control other devices, and other operations. The electronic device(s) 600 may be configured to emit light, detect sound, output audio content, and other functionality.

The electronic device(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional speakers and/or microphones, one or more battery(ies) 614, and data storage 620. The electronic device(s) 600 may further include one or more bus(es) 618 that functionally couple various components of the electronic device(s) 600. The electronic device(s) 600 may further include one or more optional antenna assembly(ies) 630, and may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the electronic device(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more vibration control module(s) 626 and/or one or more communication module(s) 628. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, speaker identification or user profile information, and/or other information.

The processor(s) 602 may be configured to access the memory 604 and execute the computer-executable instructions loaded therein. For example, the processor(s) 602 may be configured to execute the computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the vibration control module(s) 626 may include computer-executable instructions, code, or the like that responsive to execution by one or more of the processor(s) 602 may perform functions including, but not limited to, determining a length of vibration to generate, determining on and/or off time intervals or durations for haptic feedback devices, and the like.

The communication module(s) 628 may include computer-executable instructions, code, or the like that responsive to execution by one or more of the processor(s) 602 may perform functions including, but not limited to, sending and/or receiving data, including content, sending and/or receiving instructions and commands, controlling operations of antenna feeds, and the like.

Referring now to other illustrative components depicted as being stored in the data storage 620, the O/S 622 may be loaded from the data storage 620 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable lightweight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna assembly(ies) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna assembly(ies) 630 may include any suitable type of antenna depending, for example, on the communications protocols used to transmit or receive signals via the antenna assembly(ies) 630. Non-limiting examples of suitable antennae may include directional antennae, non-directional antennae, dipole antennae, folded dipole antennae, patch antennae, multiple-input multiple-output (MIMO) antennae, or the like. The antenna assembly(ies) 630 may be communicatively coupled to one or more transceivers 612 or radio components to which or from which signals may be transmitted or received.

As previously described, the antenna assembly(ies) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna assembly(ies) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna assembly(ies) 630 may be configured to transmit or receive radio frequency signals within any suitable frequency range forming part of the unlicensed portion of the radio spectrum.

The antenna assembly(ies) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna assembly(ies) 630—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna assembly(ies) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The battery(ies) 614 may be any battery suitable to power the electronic device 600. Batteries of the disclosure may be any suitable battery, such as a lithium-ion battery, an alkaline primary cell battery, and may have exterior casings or housings. In some instances, the battery may be a flexible pouch battery. The device may include optional speaker(s) and/or microphone(s), which may include any device configured to output audio and/or any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and/or use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A ring-shaped device comprising:
   a housing comprising a curved upper portion, a curved lower portion, a first curved side portion, and a second curved side portion;
   a curved antenna assembly that forms the curved upper portion of the housing, the curved antenna assembly comprising:
      a metal substrate configured for wireless communication over a Bluetooth protocol;
      a ferrite layer disposed on the metal substrate; and
      a metallic loop antenna disposed on the ferrite layer, the metallic loop antenna configured for wireless communication over a Near-Field Communication (NFC) protocol;
   a battery;
   a wireless charging coil coupled to the battery;
   a flexible printed circuit assembly coupled to the curved antenna assembly and the battery, the flexible printed circuit assembly disposed within the first curved side portion of the housing, the flexible printed circuit assembly comprising a microphone configured to receive speech input, and a speaker assembly, wherein the microphone and the speaker assembly are disposed within the curved lower portion of the housing; and
   a button assembly disposed along the curved lower portion of the housing.

2. The ring-shaped device of claim 1, further comprising:
   a first antenna feed coupled to the metal substrate at a low impedance side of the curved antenna assembly;
   an antenna ground coupled to the metal substrate at the low impedance side of the curved antenna assembly;
   a second antenna feed coupled to a first end of the metallic loop antenna at the low impedance side of the antenna assembly; and
   a third antenna feed coupled to a second end of the metallic loop antenna at the low impedance side of the antenna assembly.

3. The ring-shaped device of claim 2, wherein a first distance between the second antenna feed and the antenna ground is less than a second distance between the second antenna feed and the first antenna feed; and
   wherein a third distance between the third antenna feed and the antenna ground is less than a fourth distance between the third antenna feed and the first antenna feed.

4. The ring-shaped device of claim 1, wherein the curved antenna assembly further comprises:
   a plastic cover layer disposed on the metallic loop antenna; and
   a set of metal elements deposited on the cover layer using a physical vapor deposition process, wherein the set of metal elements form a decorative pattern.

5. A ring-shaped device comprising:
   an inner shell;
   an outer shell coupled to the inner shell, wherein the outer shell and inner shell together form a first side portion, a second side portion, and a lower portion of the ring-shaped device;
   a battery;
   an antenna assembly that forms an upper portion of the ring-shaped device, the antenna assembly comprising:
      a metal substrate;
      a ferrite layer disposed on the metal substrate; and
      a metallic loop structure disposed on the ferrite layer;
   a first side portion having a first thickness; and
   a second side portion having the first thickness, wherein the first thickness is equal to or less than a second thickness of the lower portion and a third thickness of the upper portion.

6. The ring-shaped device of claim 5, further comprising:
   a first antenna feed coupled to the metal substrate at a low impedance side of the antenna assembly, wherein the metal substrate is used for wireless communication over a Bluetooth protocol; and
   a second antenna feed coupled to a first end of the metallic loop structure at the low impedance side of the antenna assembly, wherein the metallic loop structure is used for wireless communication over a Near-Field Communication (NFC) protocol.

7. The ring-shaped device of claim 6, further comprising:
   a third antenna feed coupled to a second end of the metallic loop structure; and
   an antenna ground coupled to the metal substrate at the low impedance side of the antenna assembly;
   wherein the second antenna feed is positioned a first distance from the antenna ground and a second distance from the first antenna feed, and wherein the first distance is less than the second distance.

8. The ring-shaped device of claim 6, wherein the antenna assembly further comprises:
   an aperture extending through the metal substrate and the ferrite layer;
   wherein the second antenna feed is routed through the aperture.

9. The ring-shaped device of claim 6, further comprising:
   a flexible printed circuit assembly comprising an antenna feed component; and
   a flexible tongue component coupled to the flexible printed circuit assembly and the ferrite layer;
   wherein the second antenna feed is at least partially disposed on the flexible tongue component.

10. The ring-shaped device of claim 9, wherein the ferrite layer comprises a via having a first end and a second end, the ring-shaped device further comprising:
    a third antenna feed disposed on the flexible tongue component and coupled to the first end of the via;
    wherein a second end of the metallic loop structure is coupled to the second end of the via.

11. The ring-shaped device of claim 5, wherein the metallic loop structure is a single loop antenna.

12. The ring-shaped device of claim 5, further comprising:

a cover layer disposed on the metallic loop structure; and a set of metal elements disposed on the cover layer.

13. The ring-shaped device of claim 5, further comprising:

a wireless charging coil configured to charge the battery at 13.56 MHz.

14. The ring-shaped device of claim 5, further comprising:

a carrier component configured to separate the antenna assembly from the inner shell, wherein the carrier component is disposed along a first continuous side of the antenna assembly, a second continuous side of the antenna assembly, and a third continuous side of the antenna assembly.

15. The ring-shaped device of claim 5, wherein the antenna assembly comprises a first aperture, and the outer shell comprises a second aperture, and wherein the ring-shaped device further comprises:

a first microphone aligned with the first aperture; and a second microphone aligned with the second aperture.

16. A ring-shaped device comprising:

a ring-shaped housing comprising an outer shell, an inner shell, and an antenna assembly that forms a top portion of the ring-shaped device, wherein the antenna assembly comprises:

a metal substrate;

a ferrite material disposed on the metal substrate; and a loop antenna disposed on the ferrite layer;

a battery;

a flexible printed circuit assembly; and a first microphone disposed along a lower portion of the ring-shaped housing.

17. The ring-shaped device of claim 16, wherein the ring-shaped device is configured to receive speech input.

18. The ring-shaped device of claim 16, wherein the ring-shaped device further comprises:

a cover layer disposed on the metallic loop structure; and a set of metal elements deposited on the cover layer using a physical vapor deposition process.

19. The ring-shaped device of claim 16, wherein a thickness of the ring-shaped device is uniform along the ring-shaped device.

20. The ring-shaped device of claim 16, wherein a thickness of the ring-shaped device is non-uniform along the ring-shaped device.

* * * * *